US009791118B2

(12) United States Patent
Carpoff (10) Patent No.: US 9,791,118 B2
(45) Date of Patent: *Oct. 17, 2017

(54) MOBILE RENEWABLE ENERGY LIGHT TOWER (71) Applicant: Jeff Carpoff, Concord, CA (US)

(72) Inventor: Jeff Carpoff, Concord, CA (US)

(73) Assignee: Sirius Light Towers, LLC, Las Vegas, NV (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/601,982

(22) Filed: Jan. 21, 2015

(65) Prior Publication Data

US 2015/0215587 A1 Jul. 30, 2015

Related U.S. Application Data (60) Provisional application No. 61/933,326, filed on Jan. 30, 2014.

(51) Int. Cl.
*F21S 9/04* (2006.01)
*F21S 9/03* (2006.01)
*F21L 13/00* (2006.01)
*F21W 131/10* (2006.01)
*F21V 21/22* (2006.01)

(52) U.S. Cl.
CPC ............... *F21S 9/037* (2013.01); *F21L 13/00* (2013.01); *F21S 9/043* (2013.01); *F21S 9/04* (2013.01); *F21V 21/22* (2013.01); *F21W 2131/10* (2013.01); *Y02B 20/72* (2013.01)

(58) Field of Classification Search
CPC ....................................................... F21L 13/00
See application file for complete search history.

(56) References Cited

U.S. PATENT DOCUMENTS

| 4,220,981 A | 9/1980 | Koether |
| 8,007,124 B2 | 8/2011 | Kim |
| 8,439,534 B1 | 5/2013 | Roe et al. |
| 8,733,963 B2 | 5/2014 | Sharpley et al. |
| 8,915,697 B2 | 12/2014 | Pitre |
| 2005/0269468 A1* | 12/2005 | Gough ...................... B62B 5/00 248/300 |
| 2007/0036650 A1* | 2/2007 | Lau .......................... F03D 3/005 416/5 |
| 2010/0033015 A1* | 2/2010 | Alvarez .................. F03D 9/007 307/72 |
| 2011/0317816 A1* | 12/2011 | Bechard ................... A61B 6/00 378/98.8 |
| 2012/0020084 A1 | 1/2012 | Lampon |
| 2012/0201015 A1 | 8/2012 | Robertson et al. |

(Continued)

*Primary Examiner* — Eileen Adams
(74) *Attorney, Agent, or Firm* — NetLawyers LLP; Benedict O'Mahoney (57) ABSTRACT

The present invention is directed to a mobile light tower that utilizes multiple sources of energy to provide a highly energy efficient source of illumination. The lights of the light tower draw power from the energy stored in the batteries. During the day, solar energy can captured and stored in batteries. In times of cloud cover, or at night, wind energy can be captured and stored in the batteries. Additional alternative energy sources can also be incorporated. In the event that neither of these sources are sufficient, a fuel powered generator can be utilized to generate energy to be stored in the batteries.

22 Claims, 10 Drawing Sheets

(56) References Cited

U.S. PATENT DOCUMENTS

| | | | |
|---|---|---|---|
| 2012/0201016 A1* | 8/2012 | Robertson | F21L 4/08 362/183 |
| 2013/0039049 A1 | 2/2013 | Jones et al. | |
| 2013/0250561 A1 | 9/2013 | Knodel | |
| 2013/0301253 A1 | 11/2013 | Drever | |
| 2014/0116870 A1* | 5/2014 | Kamen | E04H 1/1205 202/83 |
| 2014/0211490 A1* | 7/2014 | Sharpley | B60P 3/18 362/485 |

* cited by examiner

MOBILE RENEWABLE ENERGY LIGHT TOWER

CROSS-REFERENCE TO RELATED APPLICATIONS

The present application claims the benefit of U.S. Provisional Application No. 61/933,326 filed on Jan. 30, 2014, incorporated by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The present invention relates to the field of portable lighting systems and devices. More specifically, the invention is directed to the field of portable lighting systems and devices utilizing multiple sources of power.

BACKGROUND OF THE INVENTION

A solar power system uses one or more solar panels to convert sunlight into electricity. Solar power systems consist of multiple components, including the photovoltaic modules, mechanical and electrical connections and mountings and means of regulating or modifying the electrical output. A wind power system uses one or more wind turbines to convert wind into electricity. Solar power and wind power devices have been supplying power to many fixed structures such as homes, buildings and other structures. The solar panels and wind turbines can be placed on the roofs of these structures or at areas of land adjacent to the structures. This configuration works well with fixed buildings because the panels or turbines can be mounted and left indefinitely. However, in some applications, temporary or emergency electrical power may be needed.

Stand alone portable solar power systems have many uses. For example, road construction or maintenance is preferably done at night when traffic is low, and the effect on drivers and traffic is minimized. Other construction is performed during the night as well when deadlines or weather patterns dictate. Additionally, sporting and entertainment events can benefit from portable lighting systems when the venues are not equipped with their own lighting systems.

Generally, at night construction sites, large lights are used to illuminate the work area so that the workers are able to see. Generally, these large lights are high wattage lights which run using a diesel powered generator. With the volatility of oil prices, diesel is, at times, very expensive, causing the cost of using the lights to increase substantially. Tower lights are generally diesel powered, producing unwanted noise and pollution. Solar powered tower lights tend to be unwieldy in terms of size and shape. Light components are generally supported by masts which are folded horizontally flat on the structure component, a configuration which tends to damage the solar panels.

What is needed is economical mobile renewable energy light tower which is small and lightweight, easily transported on conventional trucks or towed with a standard trailer hitch, which can provide reliable emergency light.

SUMMARY OF THE INVENTION

In accordance with the present invention, there is provided an mobile apparatus that enables light to be provided to locations not connected to the energy grid. The present invention discloses a mobile renewable energy light tower ("MRE Light Tower").

In one embodiment of the present invention, a MRE Light Tower is comprised of a trailer frame component, a mast component connected at its base to the trailer frame component, a utility bar component connected at the top of the mast component, some lights attached to the utility bar, a battery system mounted on the trailer frame component, a power management component mounted on the trailer frame component and electrically connected to the battery system, a renewable energy component, and a backup energy component. In an embodiment, the MRE Light Tower has a fuel component comprising the backup energy component. In one embodiment of the present invention, the MRE Light Tower also comprises a wind component.

The frame component provides the framework to secure and transport the other components comprising the MRE Light Tower, including the mast component, the utility bar, the power management component, the battery system, along with other components such as a solar component, a fuel component, a wind component, an outlet component, a plug-in component, a network component, and a surveillance component.

The frame component can comprise a trailer which can include a frame, an axle coupled to the frame, wheels coupled to the axle, a hitch coupled to a front end of the frame, and a stand for supporting the trailer frame when the MRE Light Tower is not being towed. The front end of the frame can comprise a flat surface upon which to mount a mast component; the remainder of the trailer frame can comprise a bed comprised of steel tubing in a rectangular configuration with supporting cross members. In one embodiment of the present invention, the remainder of the trailer can is constructed of a steel base with perimeter walls protruding upwards, constituting a secondary containment for all components containing effluents wherein the bed thereby contains any effluents that may leak out from any of the other components, thereby protecting the environment from potential contamination. In one embodiment of the present invention, the frame component has forklift receptacles on each side, enabling the unit to be easily loaded and unloaded from the side of a flatbed truck. In an embodiment, the axle can be a 6,000 lb. axle that is cut down and configured to fit about a 5.2 foot trailer width. In an embodiment, the hitch is a standard pintle hitch for ease of towing.

In an embodiment, the power management component and battery system can be mounted on the bed, providing additional safety and stability for the MRE Light Tower. As the battery system is primarily comprised of batteries and which comprise a substantial portion of the weight of the device, mounting the battery system on the bed provides the lowest practical center of gravity.

In an embodiment, the structure component can also include a cover coupled to the top of the frame comprising the bed to protect a power management component and battery system. In an embodiment, the cover can also protect a fuel component. In an embodiment, brackets can be attached to both sides of the frame such that a fuel component can be mounted and supported a safe distance above the battery system mounted on the bed. In an embodiment, brackets can be attached to the top of the cover to support a solar component. In an embodiment, the cover is provided with ventilation for the enclosed power management component. In an embodiment, the cover is provided with ventilation for an enclosed fuel component.

The MRE Light Tower can be fabricated to any dimensions. In an embodiment, the MRE Light Tower should be easily driven on public roads and the trailer should fit within standard traffic lanes. The width may be about 5 feet to 8.5 feet which is the maximum legal width for most U.S. highways. In an embodiment, the width is 5.2 feet, which allows maximum efficiency in transporting the MRE Light Towers on trucks. The length of the MRE Light Tower can be about 10 to 20 feet in length. In an embodiment, the length of the MRE Light Tower is 10.5 feet, which allows maximum efficiency in transporting the MRE Light Towers on trucks. The frame component can be made of steel tubing which can have circular, square or rectangular cross sections. For example, the frame may be made of 2"×3" or 3"×3" steel tube.

In an embodiment, the structure component can support a power management component and battery system on its bed, a mast component on the front end of its frame, a fuel component on its brackets above its bed, and a solar component its cover.

The mast component is used to raise the light component to the appropriate level for optimum lighting. The bottom of mast component can be attached to the front end of the front end of the frame of the structure component. The top of the mast component can be coupled to the light component. In an embodiment, the top of the mast component can also be coupled to a wind component.

In an embodiment, the mast component comprises a base support, a mast, a conduit, and a winch. A base support can comprise a stanchion, a plurality of flanges, a mast ring, and a base plate. A mast can comprise a base section, a ring interface, and a plurality of telescoping sections.

In an embodiment, the stanchion is a piece of vertically oriented steel square tube with flanges welded on each side of the lower end of the steel tube. In an embodiment, the base support is integrated with the structure component. The bottom of the steel tube and four flanges are welded to the front end of the frame of the structure component. On the front face of the lower end of the steel tube, a base plate is fixedly attached. The base plate has a hole capable of receiving a bolt, and is mounted high enough such that a nut may be affixed to the received bolt without impinging on the front end of the frame of the structure component. On the front face of the upper end of the steel tube, a ring is attached. On the back face of the steel tube, a conduit is fixedly attached.

The mast may be a two stage unit with a base section and one telescoping section, a three stage unit with a base section and two telescoping sections, or may comprise even further stages with additional telescoping sections. In some embodiments, the mast may be characterized as a telescoping construction wherein successive stages may nest within previous stages. Such construction can be beneficial to facilitate extension and contraction of the mast to alter the height thereof relative to the ground.

In an embodiment, a ring interface is mounted on the upper end of the base section. The base section is coupled to the base support such that a bolt affixed to the bottom of the base section is inserted into the hole in the base plate and affixed with a nut, and base section is oriented vertically such that the base section extends up through the ring mounted on the upper end of the base support, and the ring interface is positioned at the juncture of the ring such that the base section is capable of swiveling around its axis, thus allowing the light component to be rotated to provide optimum lighting.

In such extendable embodiments, the mast component may include a winch for moving the mast between an unextended position and an extended position. For example, the mast may be extendable such that when the mast is in an extended position, the light component connected thereto can be positioned at a height of about 24 feet relative to the ground. In one embodiment of the present invention, the height of the MRE Light Tower with the mast lowered is low enough to enable transportation on legal flatbed trailers. In one embodiment, the height of the MRE Light Tower is less than seven feet.

The light component can be coupled to the top of the mast component such that it can be raised to the optimum height for providing illumination. In an embodiment, the light component can be comprised of a light bar, light bar extensions, a plurality of brackets, and a plurality of lights. The light bar can be steel tubing configured in a t-junction such that the stem can be coupled to the topmost section of the mast, and both sides of the cross-member are configured to receive light bar extensions. The light bar extension can also be steel tubing of a smaller diameter than the cross-member of the light bar, such that the light bar extensions can rotate axially when coupled with the cross-member. Brackets can be fixedly attached to the light bar extensions. Lights can be fixedly attached to the brackets. Consequently, when the MRE Light Tower is deployed, the lights can be adjusted by swiveling the light bar extensions around a horizontal axis, and by swiveling the base section of the mast component around a vertical axis.

A variety of materials may be used in the lights. Preferably, the lights provide adequate lighting for a desired task, durability, relatively low power requirements, and a relatively long-life cycle operation. In specific embodiments, the lights may be selected from the group consisting of light emitting diodes, electrodeless induction floodlights, gas discharge lamps, and combinations thereof.

In an embodiment, the lights are 100 w LEDs. In an embodiment, four lights are mounted two each on the light bar extensions and one light mounted on the cross-member above the stem mounted to the upper portion of the mast. In an embodiment, the lights are controlled by a digital programmable timer. In an embodiment, the lights provide illumination coverage for an area of between four and six acres. In an embodiment, the lights are capable of providing 45,000 lumens of light.

The battery system is used to store energy coming in from the solar component, wind component, or fuel component, and usually comprises a plurality of batteries. The power management component interfaces between the battery system and the energy generation components and energy utilization components, and can comprise a charge controller, an AC/DC power center, and an inverter. In an embodiment, the power management component can also include a transformer. In an embodiment, the batteries can be lead acid batteries. In another embodiment, the batteries are lithium-ion batteries. In an embodiment with lithium-ion batteries, the MRE Light Tower will weigh much less, enabling the frame component to utilize a smaller axle. The weight savings also enable the MRE Light Tower to be towed by a smaller vehicle, and to utilize more robust components elsewhere. In one embodiment of the present invention, a MRE Light Tower utilizing lithium-ion batters weighs less than 1900 pounds. However, in other embodiments, any other type of rechargeable battery can be used. A charge controller may be incorporated in the power management component between the solar component and the battery system. The charge controller can be used to prevent battery damage from excessive charging or discharging. The voltage output from the solar component can be proportional to the amount of sunlight that is collected by the solar panels. However, excessive voltage can damage the batteries. Thus, the charge controller is used to maintain the proper charging voltage on the batteries. As the input voltage from the solar component rises, the charge controller regulates the charge to the batteries to prevent any over charging.

The charge controller can have a three stage charge cycle which includes bulk, absorption and float stages. During the bulk stage of the charge cycle, the charge controller can let the charge voltage to the battery gradually rise to the bulk level. In an embodiment, the batteries can be configured in series so that cumulative voltage is 48 volts. The bulk level can be between about 57.6 and 58.4 volts while the batteries draw maximum current. When the bulk level voltage is reached by the batteries, the absorption stage begins. During the absorption stage, the battery voltage can be maintained at bulk voltage level for a specified time while the current gradually tapers off as the batteries charge up.

After the absorption time passes, the battery voltage can be lowered to float level which can be between about 53.6 to 54.4 volts and the batteries can draw a small maintenance current until the next cycle.

The charge controller can use Pulse Width Modulation (PWM) or Maximum Power Point Tracking (MPPT). If the charge controller includes MPPT, the charge controller can match the output of the solar panels to the battery voltage to insure maximum charge (amps). A MPPT type charge controller can compensate for a low battery voltage by delivering increased current if the battery voltage is below the optimum level. This adjustment allows the MPPT charge controller to always output the optimum charging power to the battery. In a preferred embodiment, the battery is fully charged prior to delivering the MRE Light Tower to the application site.

An AC/DC power center can be coupled between the charge controller and the battery. The DC portion of the AC/DC power center can include various breakers and bypass switches. For example, the AC/DC power center may include a first DC breaker which prevents excessive current from being transmitted from the solar component to the batteries and a second DC breaker which prevents excessive power from being drawn from the system. In an embodiment, the first and second DC breakers may each be set for 250 A. The 20 AC/DC power center can also include an AC section which can include a switch which can break the AC power from the inverter to the light component. In an embodiment, the AC/DC power center can be a Magnum MMP 250-60S.

Power from the battery and solar arrays can be transmitted through the AC/DC power center to an inverter to convert the direct current (DC) electrical energy into alternating current (AC). For example, in an embodiment, the solar panel arrays may each product 48 volts DC and the batteries may be configured to store electrical power with a 48 volt DC output. The inverter may convert the DC voltage from the solar component and the batteries into an AC output. For example, the inverter can convert 48 volt DC into 120 volt AC with a cycle frequency of 60 Hz. In other embodiments the voltage output can be any other suitable level. In an embodiment, the inverter can be a Sunny Island 4548-US or 6048-US.

In an embodiment, the plurality of batteries is comprised of 48 Volt Deep Cycle Industrial batteries providing 510 AMP hours @ 48V Nominal.

The generator provides additional energy on demand to the power management component when insufficient energy is provided by other components, such as a solar component or a wind component. In an embodiment, the device uses less than one gallon of fuel for every one night of usage, providing as much as 75% savings in diesel usage and cost. In an embodiment, the generator can be a Cummins Onan Diesel, 120 Volt 50 AMP System.

In one embodiment of the present invention, the solar component can be comprise of one or more solar arrays which convert sunlight into electricity. The solar arrays are electrically coupled to the power management component, which in turn is connected to the battery system and the power generated by the solar arrays is stored and buffered within the batteries of the battery system. The solar component is coupled to the power management component by a power cable which is routed through the conduit of the mast component.

The wind component can be comprised of a turbine that generates electricity from the kinetic energy of wind. In an embodiment, a charge controller is integrated into the wind component to convert AC to DC for transmission to the power management component. In an embodiment, the turbine is configured to generate DC, obviating the need for an integrated charge controller. The wind component is electrically connected to the power management component.

In an embodiment, a plug-n component is incorporated into the device so that the battery system can be charged from a traditional electrical outlet if one happens to be available.

In an embodiment, an outlet component is incorporated into the device. An outlet component can comprise a 120V 20 Amp receptacle.

In an embodiment, a WiFi component is incorporated into the device. In an embodiment, the WiFi component can be communicatively coupled with other components, such as the power management component, wherein data about power usages can be transmitted, and control functions and commands can be received over the WiFi connection.

In an embodiment, a surveillance component can be mounted on the top of the mast component. The surveillance component can be comprised of a video camera, means for mounting the video camera on the mast component, and means for storing video data. In another embodiment, the surveillance component is communicatively coupled with a WiFi component, allowing video data to be accessed or streamed over a WiFi connection.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Figure 1:
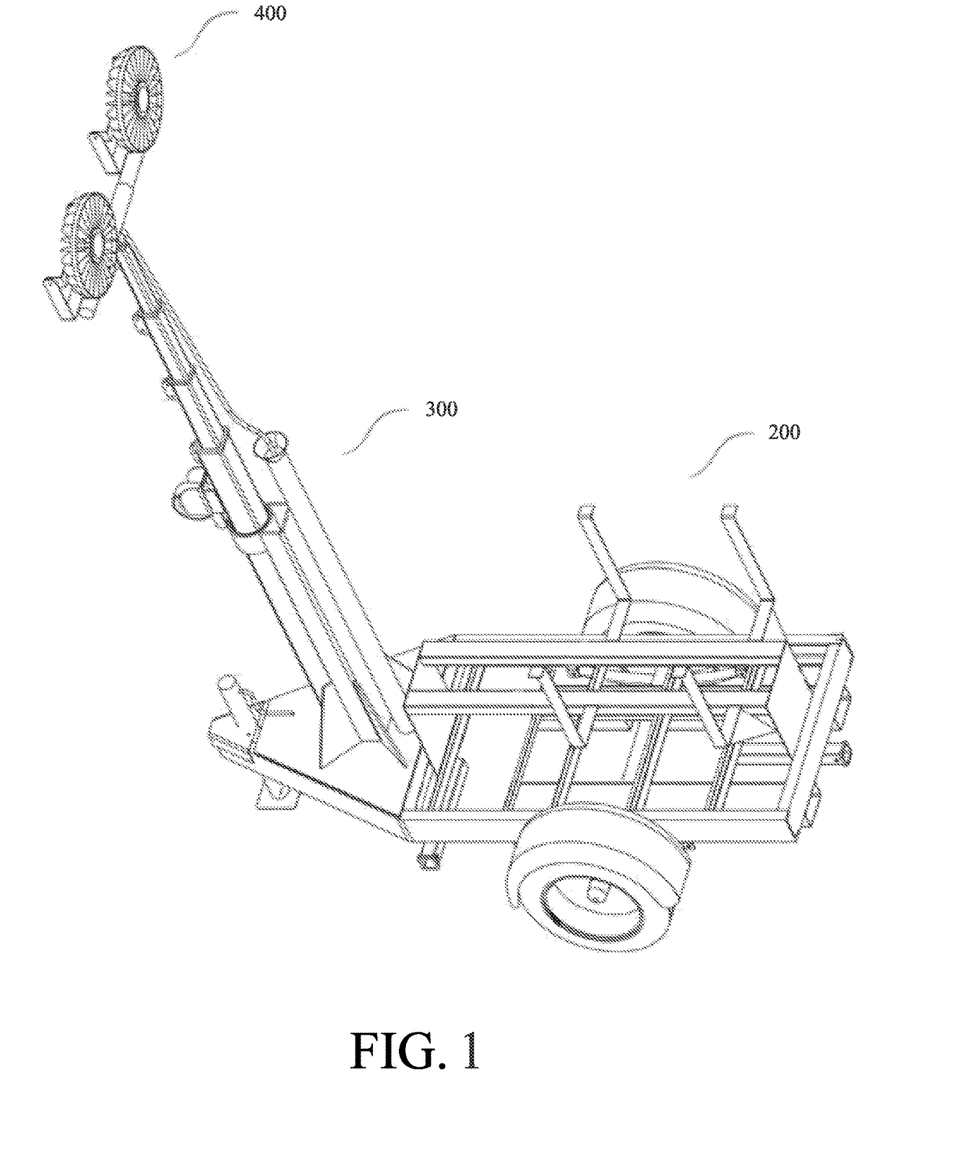
FIG. 1 is a line drawing of a top oblique view of the frame component, mast component and utility bar.

In FIG. 1, the three core structural components of a MRE Light Tower are shown. A frame 200 provides both the mobility and stability for a MRE Light Tower. The frame 200 provides the platform base for attachment of a power source, as well as other energy providers such as a fuel component, a solar component, a wind component, a fuel cell component, and a plug-in component. The frame 200 also provides the platform base upon which to fixedly attach a mast 300. The mast 300 is preferably fixedly attached to the frame by welding flanges on the mast 300 to a flat surface on the frame 200.

Figure 2:
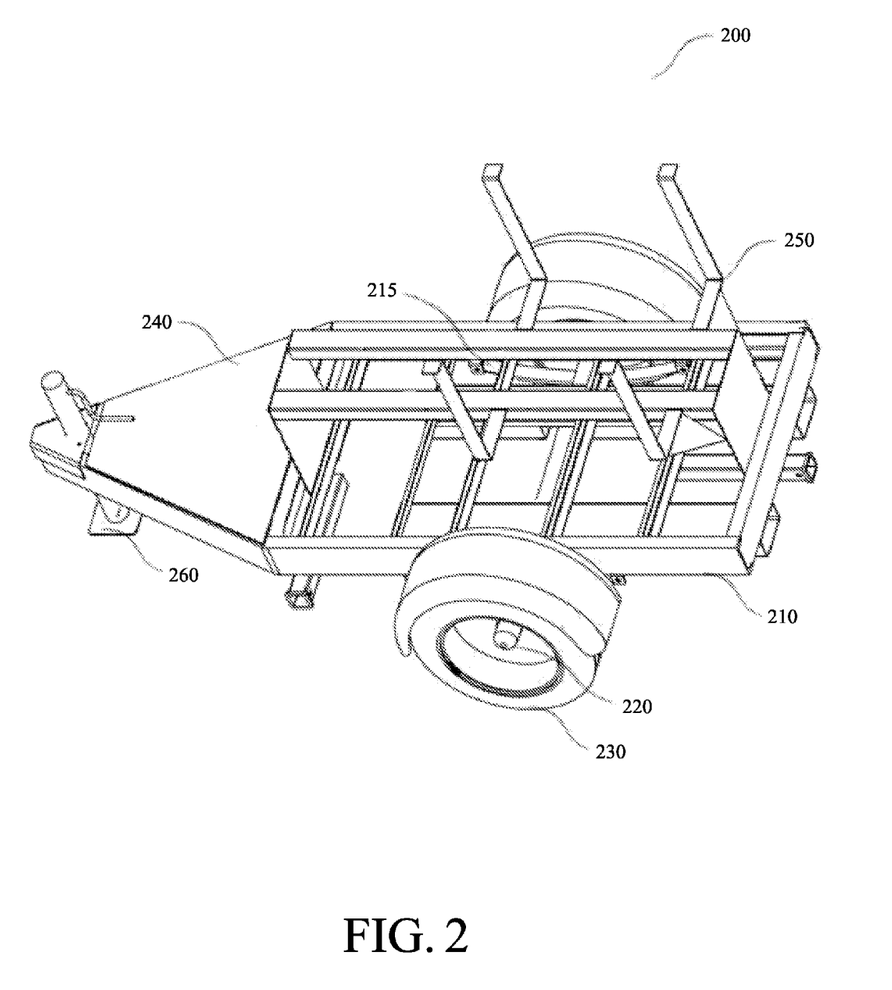
FIG. 2 is a line drawing of a top oblique view of the frame component.

Turning now to FIG. 2, the basic structure of the frame 200 is shown. The frame 200 provides the framework to secure and transport the other components comprising the present invention, including the mast component, the utility bar, the power management component, the battery system, along with other energy sources such as a fuel component, a solar component, a wind component, a fuel cell component, and a plug-in component. Other features such as an outlet component, a network component, and a surveillance component can also be attached to the frame 200. Network component and surveillance component can alternatively be attached to the mast or to a utility bar.

The frame 200 comprises a trailer which can include a rear frame 210, leaf springs 215 coupled to the rear frame 210, an axle 220 coupled to the leaf springs 215, wheels 230 coupled to the axle 220, a forward frame 240 attached to the rear frame 210, and a housing frame 250. The housing frame can be used to attach a covering for a power management component and battery system, as well as to provide a base upon which to attach a fuel component and a solar component. In one embodiment of the present invention, the rear frame 210 can comprise a bed comprised of steel tubing in a rectangular configuration with supporting cross members. In an embodiment, the rear frame 210 comprise perimeter walls protruding upwards from a steel base with, constituting a secondary containment for all components containing effluents wherein the bed thereby contains any effluents that may leak out from any of the other components. In an embodiment, the axle can be a 6,000 lb. axle that is cut down and configured to fit an approximate 5.2 foot trailer width. In an embodiment, a hitch is coupled to a front end of the forward frame 240, and a stanchion 260 for supporting the frame 200 when the MRE Light Tower is not being towed. The forward frame 240 can include a flat surface upon which to mount a mast component. In one embodiment, the hitch is a standard pintle hitch for ease of towing.

Still referring to FIG. 2, in an embodiment, the housing frame 250 can also include a cover coupled to the housing frame 250 to protect a power management component and battery system. In an embodiment, the cover can also protect a fuel component. In an embodiment, brackets can be attached to both sides of the housing frame 250 such that a fuel component can be mounted and supported a safe distance above the power management component and battery system mounted on the bed of the rear frame 210. In an embodiment, brackets can be attached to housing frame 250 to support a solar component. In an embodiment, a cover attached to the housing frame 250 is provided with ventilation for an enclosed power management component. In an embodiment, the cover is provided with ventilation for an enclosed fuel component.

The frame 200 can be fabricated to any dimensions. In an embodiment, the frame should be easily driven on public roads and should fit within standard traffic lanes. The width of the frame 200 may be approximately 5 feet to 8.5 feet which is the maximum legal width for most U.S. highways. In an embodiment, the width of the frame 200 is 5.2 feet, which allows maximum efficiency in transporting the trailers on trucks. The length of the frame 200 can be about 10 to 20 feet in length. In an embodiment, the length of the frame 200 is 10.5 feet, which allows maximum efficiency in transporting the trailers on trucks. The frame 200 can be made of steel tubing which can have circular, square or rectangular cross sections. For example, the frame 200 may be made of 2"×3" or 3"×3" steel tube.

Figure 3:
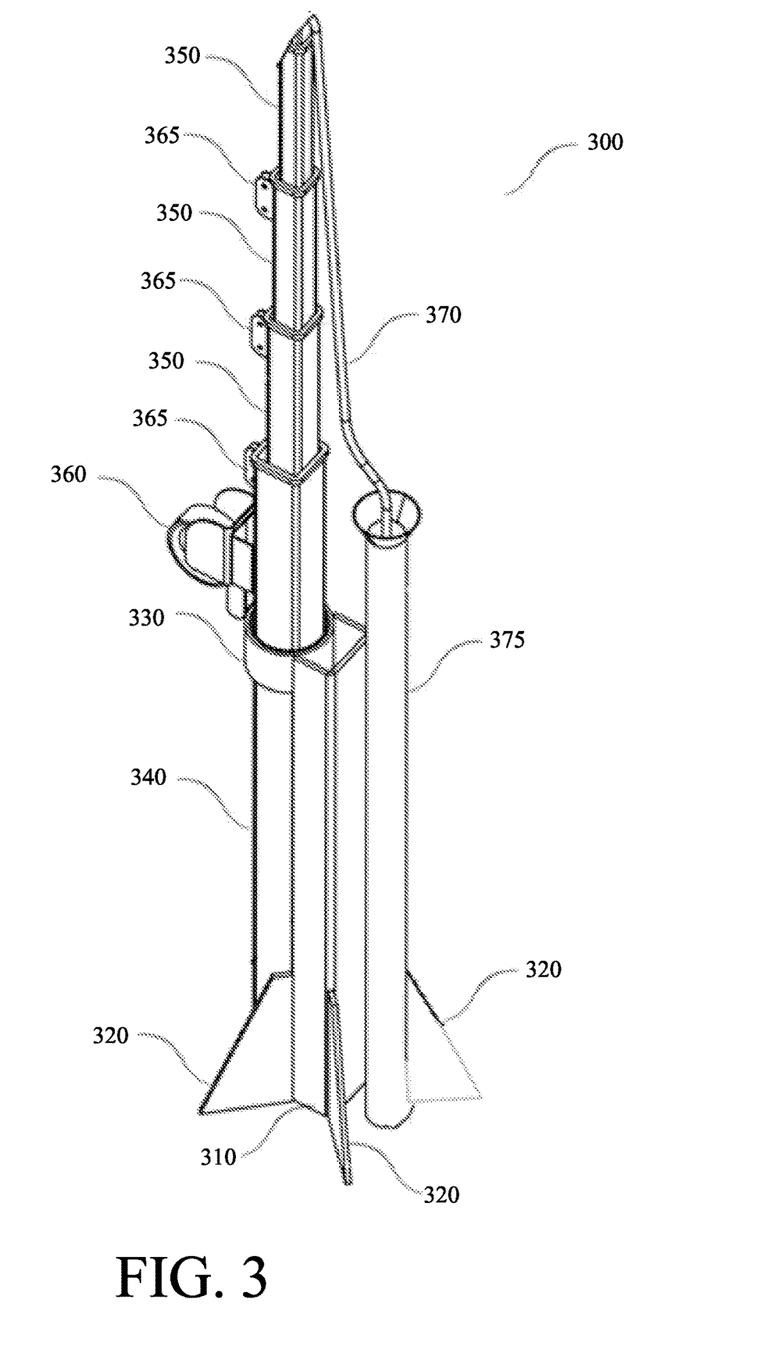
FIG. 3 is a line drawing of a side oblique view of the mast component.

Turning now to FIG. 3, the mast 300 is used to raise the utility bar component, which is attached to the light component, to the appropriate level for optimum lighting when in use, and to lower the utility bar component when the MRE Light Tower is not in use, being transported, or in storage. The bottom of the mast 300 can be attached to the forward frame of the frame of the structure component. The top of the mast 300 can be coupled to a utility bar component attached to a light component.

In an embodiment, the mast 300 comprises a base support, which base support comprises a stanchion 310, a plurality of flanges 320, and a mast ring 330. The mast 300 further comprises a base mast section 340, a plurality of telescoping mast sections 350, a winch 360, a plurality of winch cable guides 365, electrical cable 370, and an electrical cable conduit 375.

Still referring to FIG. 3, in an embodiment, the stanchion 310 is a piece of vertically oriented steel square tube with flanges 320 welded on each side of the lower end of the steel tube. In an embodiment, the base support is integrated with the frame at the forward frame. The bottom of the steel tube of the stanchion 310 and four flanges 320 are welded to the forward frame of the frame of the structure component. On the front face of the lower end of the steel tube of the stanchion 310, a base plate is fixedly attached. The base plate has a hole capable of receiving a bolt, and is mounted high enough such that a nut may be affixed to the received bolt without impinging on the front end of the forward frame of the structure component. On the front face of the upper end of the steel tube of stanchion 320, a mast ring 360 is attached. On the back face of the steel tube of the stanchion 310, an electrical cable conduit 375 is fixedly attached.

The mast 300 may be a two stage unit with a base mast section 340 and one telescoping mast section 350, a three stage unit with a base mast section 340 and two telescoping mast sections 350, a four stage unit as shown with a base mast section 340 and three telescoping mast sections 350, or may comprise even further stages with additional telescoping mast sections. In some embodiments, the mast 300 may be characterized as a telescoping construction wherein successive stages may nest within previous stages. Such construction can be beneficial to facilitate extension and contraction of the mast to alter the height thereof relative to the ground.

Still referring to FIG. 3, in an embodiment, a mast ring 330 is mounted on the upper end of the stanchion 310. The stanchion 310 is fixedly attached to the forward frame such that a bolt affixed to the bottom of the stanchion is inserted into the hole in a base plate fixedly attached to, or part of, the forward frame, and affixed with a nut, and the stanchion 310 is oriented vertically such that the base mast section 340 extends up through the mast ring 330 mounted on the upper end of the stanchion 310, and mast base section 340 has a mast ring interface is positioned at the juncture of the mast ring 330 such that the base mast section 340 is capable of swiveling around its axis, thus allowing the light component to be rotated to provide optimum lighting.

In such extendable embodiments, the mast 300 may include a winch 360 for moving a plurality of telescoping mast sections 350 between an un-extended position and an extended position. For example, the mast 300 may be extendable such that when the mast 300 is in an extended position, the light component connected thereto can be positioned at a height of about 24 feet relative to the ground. In one embodiment of the present invention, the mast 300 may be un-extendable such that when the mast 300 is in an un-extended position, the light component connected thereto can be positioned at a height of about 7 feet relative to the ground.

Figure 4:
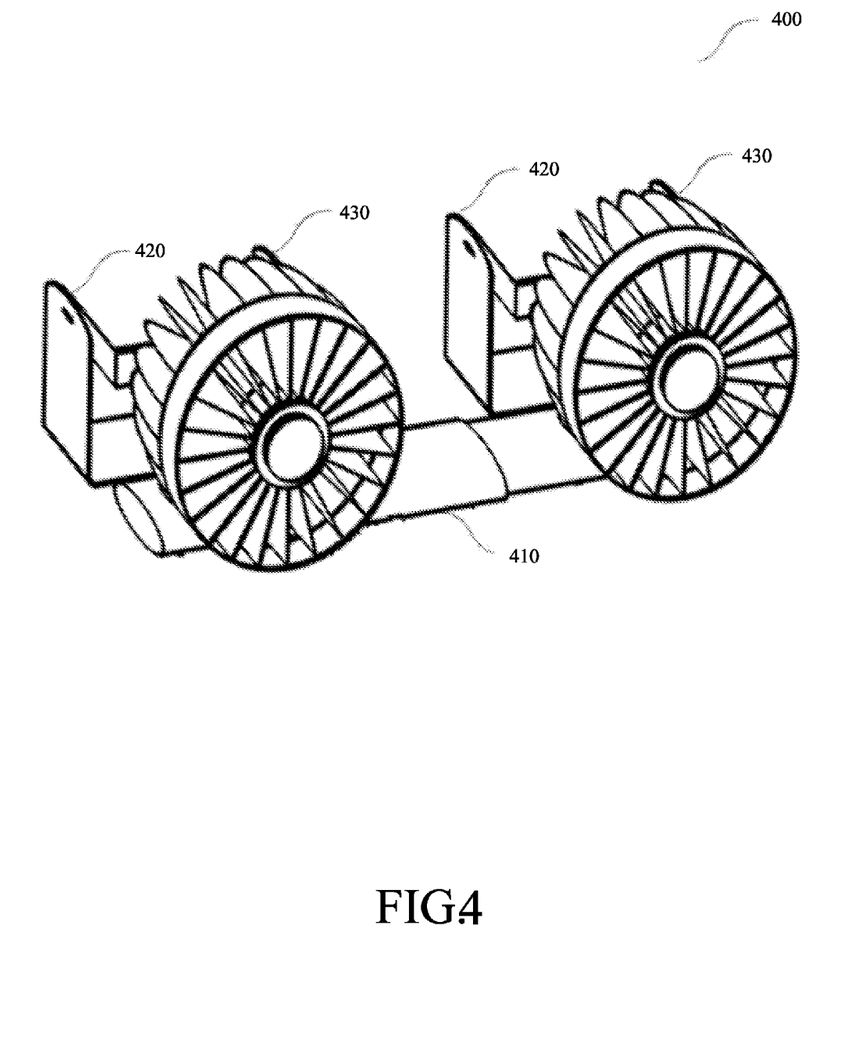
FIG. 4 is a line drawing of a front oblique view of the utility bar.

The light component can be coupled to the top of the mast component such that it can be raised to the optimum height for providing illumination. Turning now to FIG. 4, in an embodiment, the light component can be comprised of a utility bar extension 410, a plurality of brackets 420, and a plurality of lights 430. The utility bar can be steel tubing configured in a t-junction such that the stem can be coupled to the topmost section of the mast, and both sides of the cross-member are configured to receive utility bar extensions 410. The utility bar extension 410 can also be steel tubing of a smaller diameter than the cross-member of the utility bar, such that the utility bar extensions 410 can rotate axially when coupled with the cross-member. Brackets 420 can be fixedly attached to the light bar extensions. Lights 430 can be fixedly attached to the brackets. Consequently, when the MRE Light Tower is deployed, the lights 430 can be adjusted by swiveling the utility bar extensions 410 around a horizontal axis, and by swiveling the base section of the mast component around a vertical axis.

Figure 5:
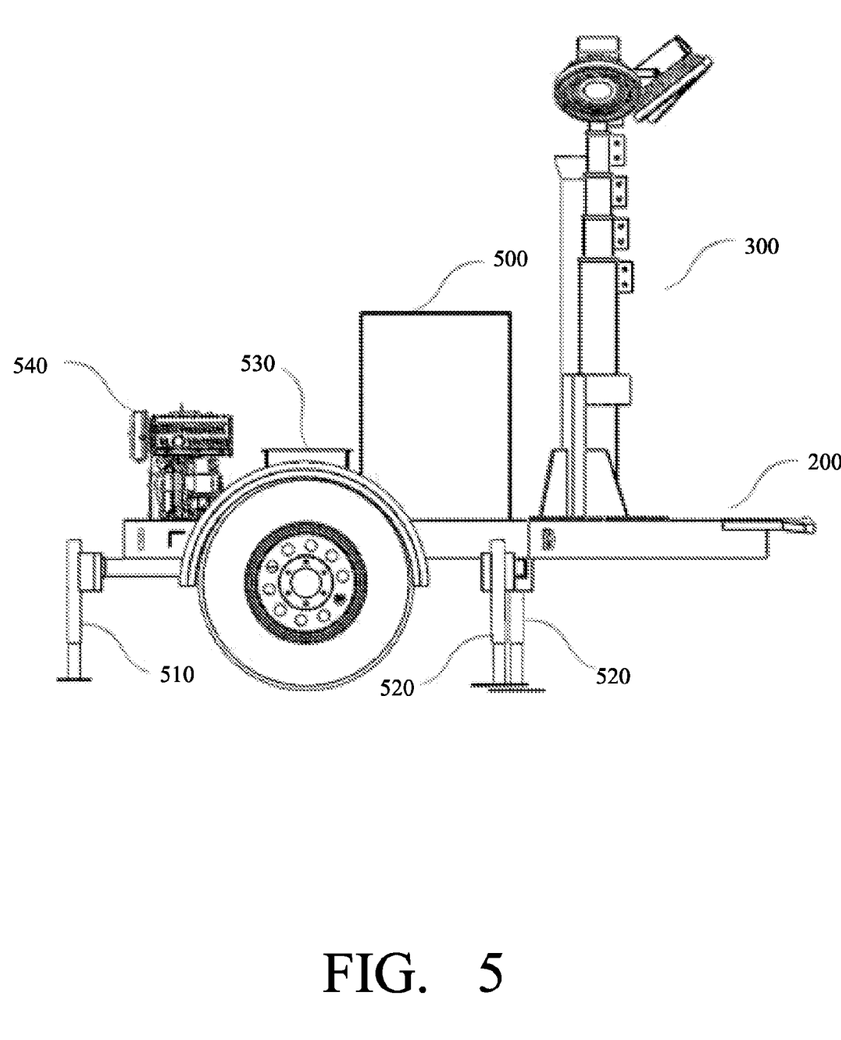
FIG. 5 is a line drawing of a side oblique view of the frame component, mast component, utility bar, generator, battery system and power management component.

In an embodiment, the power management component and battery system can be mounted on the bed, providing additional safety and stability for the MRE Light Tower. As the battery system is primarily comprised of batteries and which comprise a substantial portion of the weight of the device, mounting the battery system on the bed provides the lowest practical center of gravity. Turning now to FIG. 5, shown is a side view of the frame, mast, utility bar, battery and power management components. In operating mode, the frame component 200 is supported by rear stanchion 510 and side stanchions 520. The frame component 200 supports the mast component 300, a power management component 500, a battery system 530, and a generator 540. In an embodiment, the battery system 530 comprises lithium-ion batteries.

Figure 6:
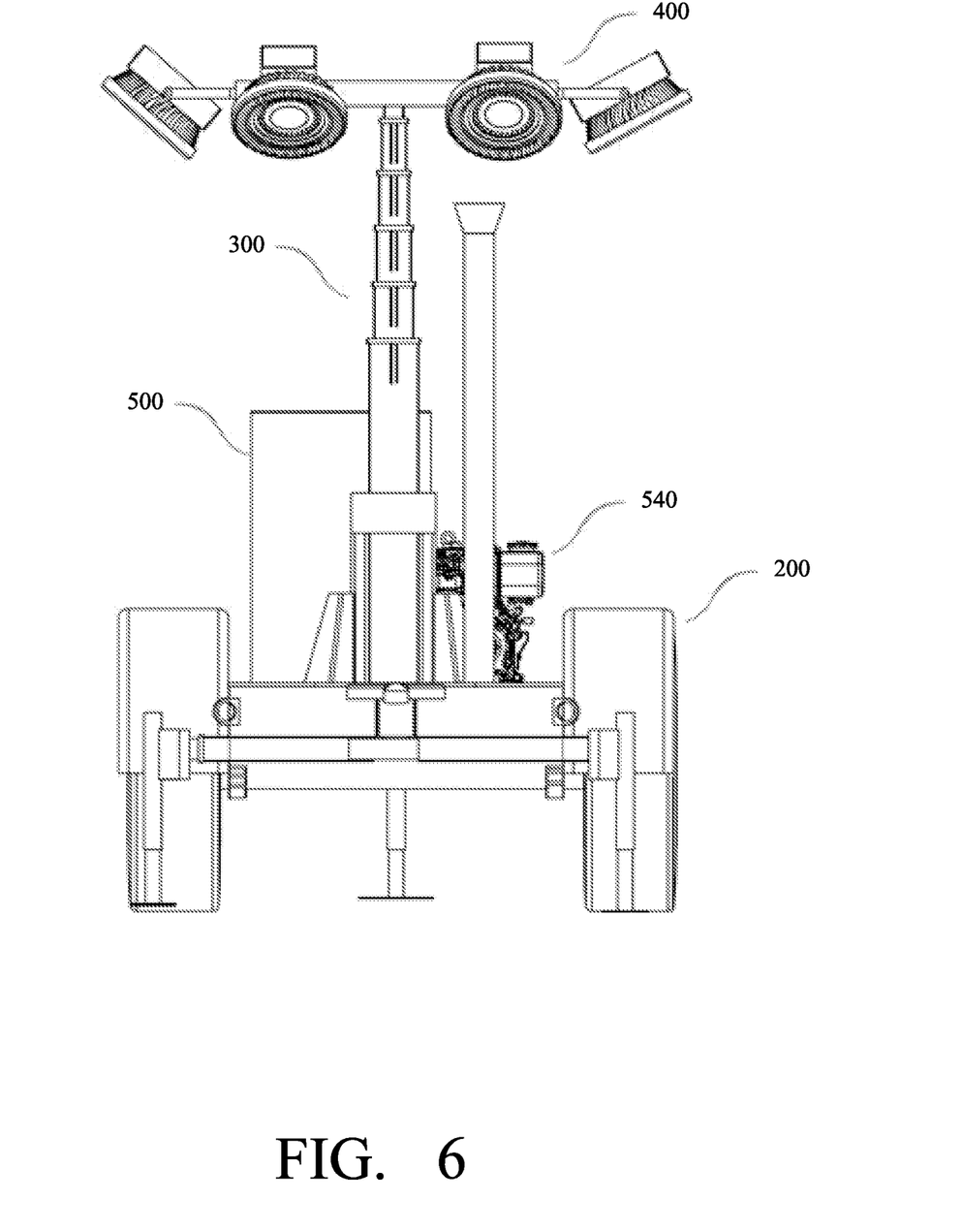
FIG. 6 is a line drawing of a front view of the frame component, mast component, utility bar, generator, and power management component.

Turning now to FIG. 6, shown is a front view of frame component 200, mast component 300, utility bar 400, power management component 500, and generator 540.

Figure 7:
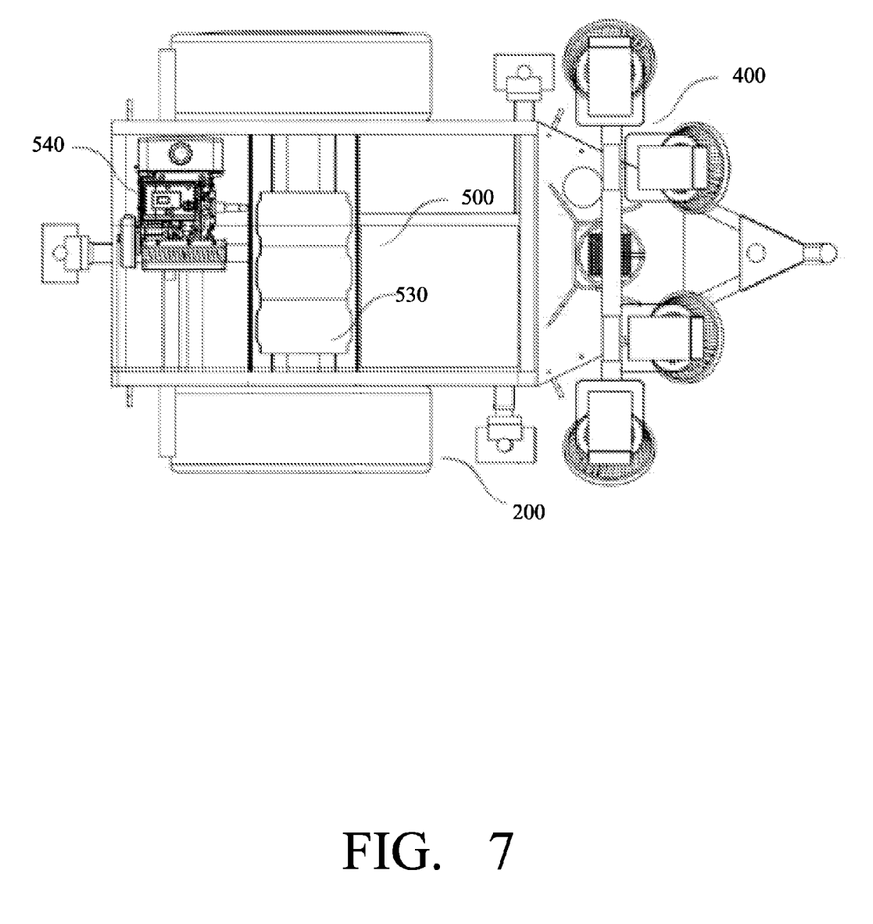
FIG. 7 is a line drawing of a top view of the frame component, utility bar, battery system, generator, and power management component.

Turning now to FIG. 7, shown is a top view of the frame component 200, utility bar 400, power management component 500, battery system 530, and generator 540.

Figure 8:
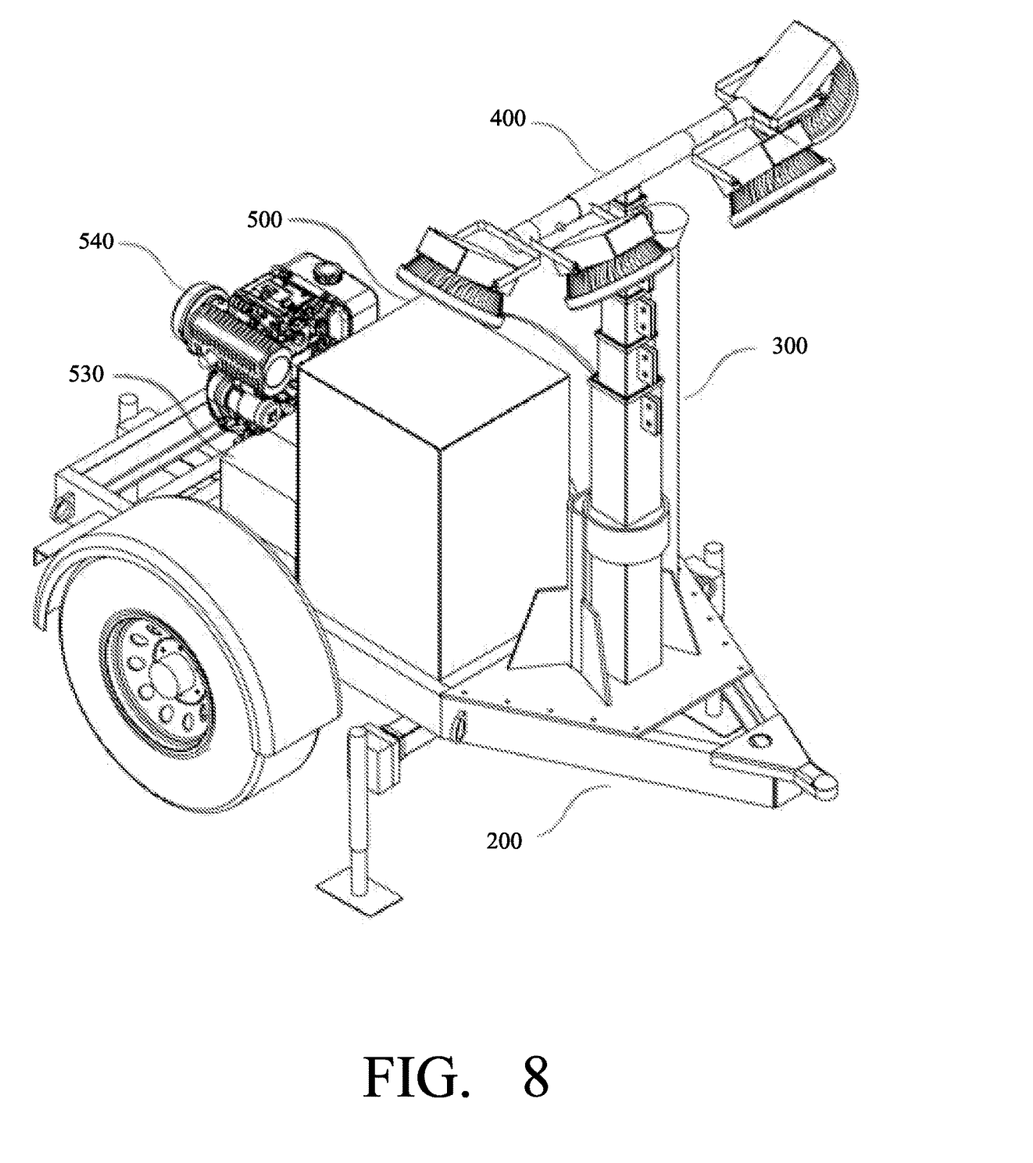
FIG. 8 is a line drawing of a front oblique view of the frame component, mast component, utility bar, battery system, generator, and power management component.

Turning now to FIG. 8, shown is a front oblique view of the frame 200, mast 300, utility bar 400, power management component 500, battery system 530 and generator 540.

Figure 9:
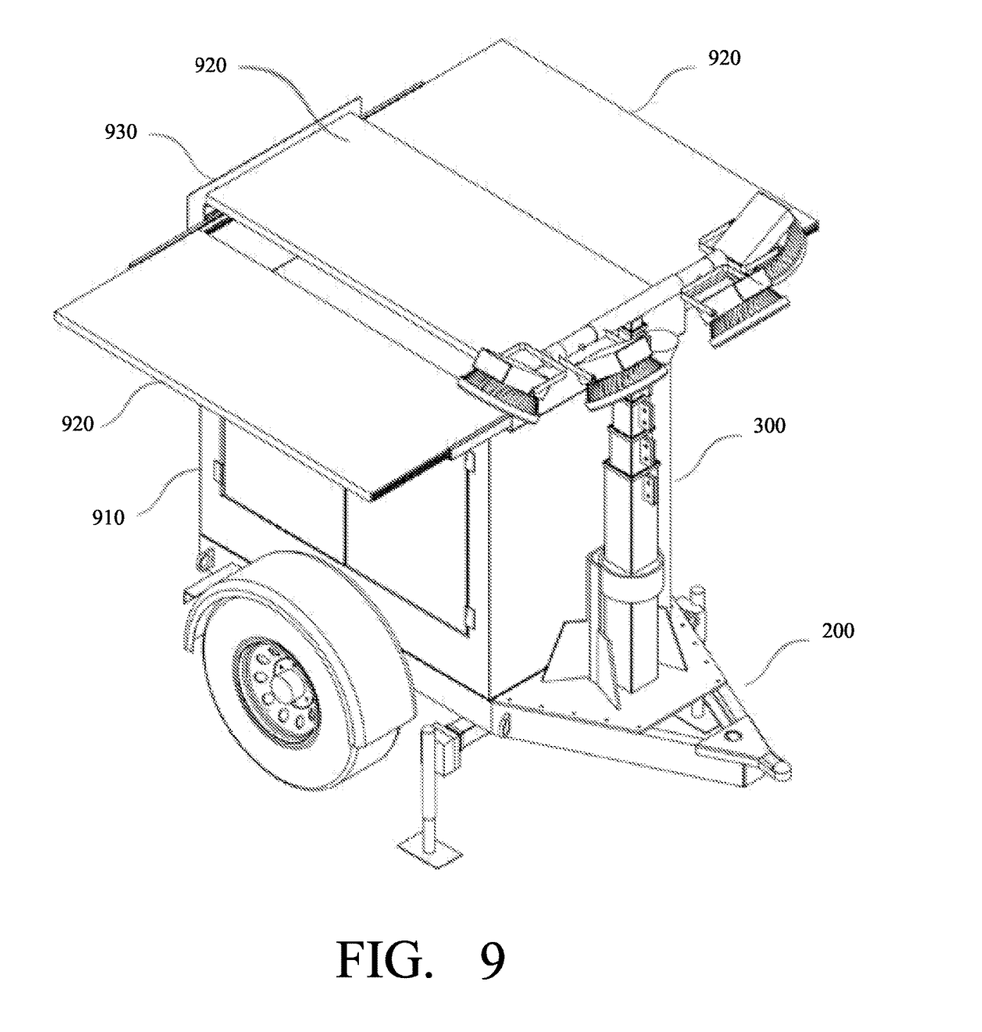
FIG. 9 is a line drawing of a front oblique view of the frame component, mast component, utility bar, housing, and solar component.

Turning now to FIG. 9, shown is a front oblique view the frame 200, mast 300, utility bar 400, housing cover 910, and solar component comprising solar panels 920 and solar panel brackets 930.

Figure 10:
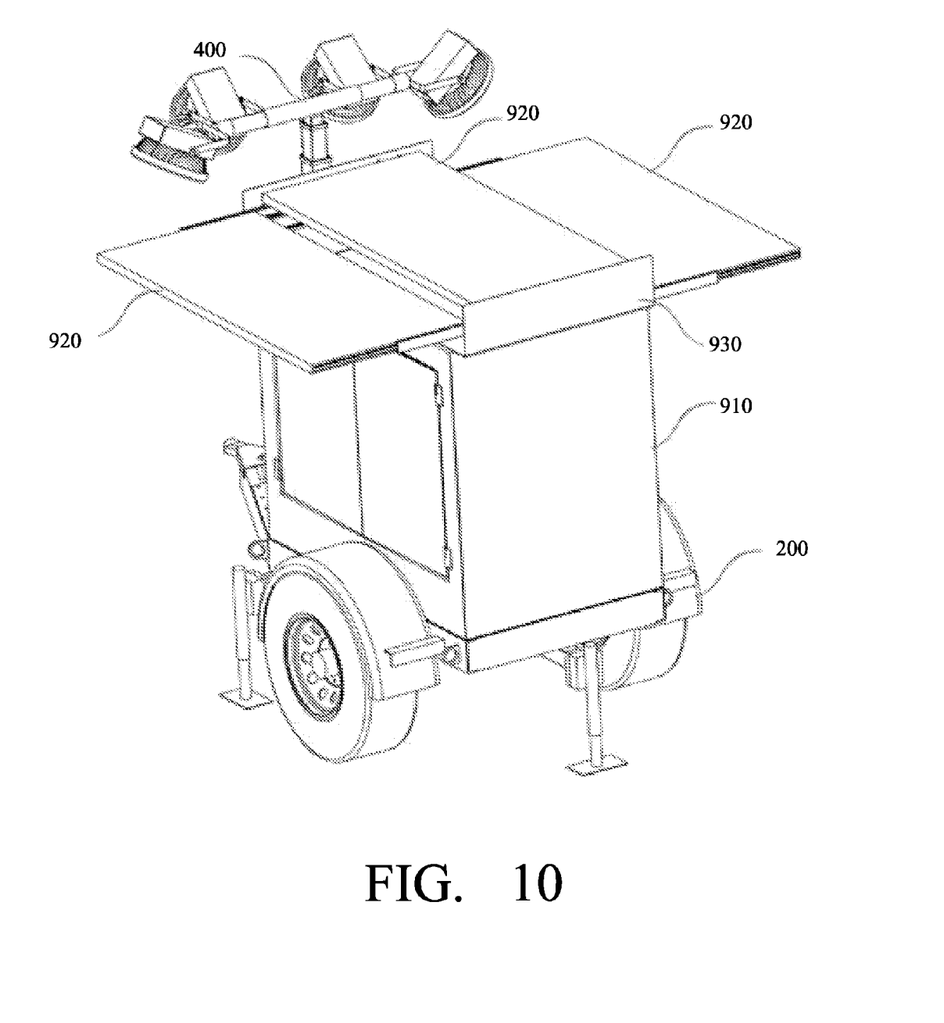
FIG. 10 is a line drawing of a rear oblique view of the frame component, mast component, utility bar, housing, and solar component.

Turning now to FIG. 10, shown is a rear oblique view of the frame 200, mast 300, utility bar 400, housing cover 910, and solar component comprising solar panels 920 and solar panel brackets 930.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. An apparatus for providing mobile illumination from a renewable energy source, comprising:
   a. a trailer frame component;
   b. a mast component, wherein the bottom of said mast component is fixedly attached to said trailer frame component;
   c. a utility bar attached to the top of said mast component;
   d. one or more lights attached to said utility bar;
   e. a battery system mounted on said trailer frame component;
   f. a power management component mounted on said trailer frame component and electrically connected to said battery system and said one or more lights;
   g. a renewable energy generator electrically connected to said power management component;
   h. a backup energy generator powered by a fuel component and electrically connected to said power management component;
   wherein said power management component receives power generated by said renewable energy generator if available, otherwise from said backup generator, and stores said power in said battery system for use in illuminating said one or more lights.

2. The apparatus of claim 1 further comprising a housing cover with ventilation means mounted on said trailer frame component wherein said housing cover encloses said battery system and said power management component.

3. The apparatus of claim 2 wherein said housing cover further encloses said backup energy generator.

4. The apparatus of claim 1 wherein said renewable energy generator comprises one or more solar panels.

5. The apparatus of claim 1 wherein said renewable energy generator comprises one or more wind turbines.

6. The apparatus of claim 1 wherein said renewable energy generator comprises one or more fuel cells.

7. The apparatus of claim 1 wherein said backup energy generator comprises a gas-powered generator mounted on said trailer frame component.

8. The apparatus of claim 1 wherein said power management component prioritizes energy generated from said renewable energy generator.

9. The apparatus of claim 1 further comprising one or more secondary renewable energy generators wherein each of said one or more secondary renewable energy generators provide power from a different renewable energy source than said renewable energy generator.

10. The apparatus of claim 9 wherein each of said one or more secondary renewable energy generators provide power from a different renewable energy source than said renewable energy generator and each of the other said one or more secondary renewable energy generators.

11. The apparatus of claim 10 wherein said power management component prioritizes power generation on the optimal source.

12. The apparatus of claim 1 wherein said trailer frame component is optimized for transportation on a standard semi-trailer such that the width of said trailer frame component is less than half the width of said standard semi-trailer whereby two of said apparatus may be loaded side-by-side on said standard semi-trailer.

13. The apparatus of claim 1 further comprising a compound winch and pulley system affixed to said mast component wherein each mast segment moves vertically in the same ratio as each other mast segment.

14. The apparatus of claim 1 wherein said power management component includes a charge controller, an AC/DC power center, an inverter, and a transformer.

15. The apparatus of claim 1 further comprising an electrical outlet electrically connected to said power management component, wherein said electrical outlet is a 120 volt 20 amp receptacle.

16. The apparatus of claim 1 further comprising a plug in connector electrically connected to said power management component whereby said plug in connector can be connected to a recharging station to recharge said battery system.

17. The apparatus of claim 1 further comprising a wireless network connector communicatively connected to said power management component whereby information can be transmitted from said power management component to remote locations.

18. The apparatus of claim 17 wherein said wireless network connector can receive instructions from remote locations.

19. The apparatus of claim 17 further comprising a video camera communicatively connected to said wireless network connector whereby video images can be transmitted from said video camera to remote locations.

20. The apparatus of claim 1 wherein said trailer component further comprises a base with perimeter walls protruding upwards, thereby comprising a secondary containment for any components containing effluents whereby said secondary containment retains any effluents that may leak out from any of said components containing effluents.

21. The apparatus of claim 1 wherein said trailer component further comprises forklift receptacles mounted on each side of said trailer component.

22. The apparatus of claim 1 wherein said trailer component is less than 10 feet 7 inches in length thereby providing efficiency in transporting said apparatus on a standard semi-trailer.

* * * * *